US012786475B2

(12) United States Patent
Hinds et al.

(10) Patent No.: US 12,786,475 B2
(45) Date of Patent: Nov. 3, 2026

(54) AI TEXT FOR VIDEO STREAMS

(71) Applicant: Tencent America LLC, Palo Alto, CA (US)

(72) Inventors: Arianne Hinds, Los Gatos, CA (US); Stephan Wenger, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/903,535

(22) Filed: Oct. 1, 2024

(65) Prior Publication Data

US 2025/0119587 A1 Apr. 10, 2025

Related U.S. Application Data

(60) Provisional application No. 63/542,739, filed on Oct. 5, 2023.

(51) Int. Cl.

| | |
|---|---|
| ***H04N 19/70*** | (2014.01) |
| ***G06T 11/60*** | (2006.01) |
| ***H04N 19/46*** | (2014.01) |

(52) U.S. Cl.

CPC .............. *H04N 19/70* (2014.11); *G06T 11/60* (2013.01); *H04N 19/46* (2014.11)

(58) Field of Classification Search

CPC ..................... G06T 13/80; G06T 11/00; G06T 2207/10016; G06T 2211/441; G06F 40/279; G06F 40/40; G06N 3/0475; G06N 3/08; G06N 20/00; G11B 27/031; H04N 21/85

See application file for complete search history.

(56) References Cited

U.S. PATENT DOCUMENTS

| | | | | |
|---|---|---|---|---|
| 2009/0080855 | A1 | 3/2009 | Senftner et al. | |
| 2012/0230429 | A1 | 9/2012 | Boyce et al. | |
| 2014/0092994 | A1 | 4/2014 | Wang | |
| 2020/0053408 | A1 | 2/2020 | Park et al. | |
| 2020/0126186 | A1* | 4/2020 | Kim | G06N 20/10 |
| 2020/0234508 | A1 | 7/2020 | Shaburov et al. | |
| 2020/0314246 | A1 | 10/2020 | Hart | |
| 2020/0359104 | A1 | 11/2020 | Luo et al. | |
| 2021/0377554 | A1 | 12/2021 | Kim et al. | |
| 2021/0383584 | A1* | 12/2021 | Zhang | G06N 3/045 |
| 2022/0329837 | A1* | 10/2022 | Li | H04N 19/436 |

(Continued)

OTHER PUBLICATIONS

International Search Report dated Jan. 10, 2025 in Application No. PCT/US2024/049924.

(Continued)

*Primary Examiner* — Fabio S Lima

(74) *Attorney, Agent, or Firm* — Sughrue Mion, PLLC

(57) ABSTRACT

A method and apparatus comprising computer code for video processing, the method including receiving a text prompt from a user device, the text prompt being used for instructing an artificial intelligence (AI) generative process to generate one or more images; encoding a video in a bitstream, the video comprising the one or more images generated using the AI generative process and the text prompt; signaling the text prompt in the bitstream in a supplemental enhancement information (SEI) message; and signaling the encoded video comprising the one or more images.

20 Claims, 13 Drawing Sheets

(56) References Cited

U.S. PATENT DOCUMENTS

| | | | | |
|---|---|---|---|---|
| 2024/0098307 | A1* | 3/2024 | Ma | H04N 19/68 |
| 2024/0325885 | A1* | 10/2024 | Panneer | A63F 13/355 |

OTHER PUBLICATIONS

Written Opinion of the International Searching Authority Dated Jan. 10, 2025 in International Application No. PCT/US2024/049924.
International Search Report dated Feb. 13, 2025 in Application No. PCT/IB2024/061637.
Written Opinion of the International Searching Authority Dated Feb. 13, 2025 in International Application No. PCT/IB2024/061637.

* cited by examiner

FIG. 12

| | ai_text_data (payloadSize) { | Description |
|---|---|---|
| 1201 | ai_data_purpose | u() |
| 1202 | ai_data_cancel_flag | u() |
| | If (ai_data_cancel_flag) { | |
| 1203 | ai_data_persistence_flag | u() |
| 1204 | ai_data_string | st() |
| | } | |
| | } | |

AI TEXT FOR VIDEO STREAMS

CROSS REFERENCE TO RELATED APPLICATION

The present application claims priority to U.S. Provisional Application No. 63/542,739, filed on Oct. 5, 2023, the disclosure of which is incorporated herein in its entirety.

FIELD

Embodiments of this disclosure are directed to video coding and decoding. Specifically, embodiments of the present disclosure are related to the carriage of text for AI applications (hereafter referred to as AI text) within the coded video stream for video-based applications.

BACKGROUND

Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 GB/s bandwidth. An hour of such video requires more than 600 GB of storage space.

Accordingly, video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed.

Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Another technique used in video coding standards is the Supplemental Enhancement Information (SEI) message which enables the carriage of information, within the coded bitstream, that is supplemental to the coded video. Such SEI information may or may not be directly related to the video coding process. In most cases, the information in SEI messages is relevant to application processes that are executed in tandem with, or closely following, the video decoding process. For example, such applications can include a rendering process that uses certain SEI messages to adjust the brightness or color space of the decoded video frames prior to presentation by a display device.

Within the current standards that utilize SEI messages, e.g., H.264, AVC, H.265, HEVC, an H.266, and VVC can be separated into two broad classes: those that can impact the video decoding process, and those that cannot impact the video decoding process, i.e., for external applications. SEI messages that cannot impact the decoding process are specified in a separate specification entitled "Versatile supplemental enhancement information messages for coded video bitstreams" (VSEI), whereas SEI messages that can affect the decoding process are specified in the main coding specification "Versatile Video Coding."

In related art, SEI messages enable the carriage (or reference via Uniform Resource Identifiers) of neural networks that are to be applied to one or more of the decoded pictures from within the video stream. However, not all AI-based applications may choose to leverage these newly specified SEI messages as these messages are specified to either reference or carry a neural network model. Rather, there are some AI applications where the neural network does not need to be carried (or referenced from) the coded video stream, e.g., emerging applications for generative Artificial Intelligence.

There is no protocol for providing imagery along with corresponding supplemental information to one or more neural network models that create or "generate" a new or similar image-based result. The neural network models for these applications need to be referenced directly from the applications, and may not need them to be sent in the coded video stream.

SUMMARY

According to an embodiment, a method and apparatus comprising computer code for video processing is provided. The method including receiving a text prompt from a user device, the text prompt being used for instructing an artificial intelligence (AI) generative process to generate one or more images; encoding a video in a bitstream, the video comprising the one or more images generated using the AI generative process and the text prompt; signaling the text prompt in the bitstream in a supplemental enhancement information (SEI) message; and signaling the encoded video comprising the one or more images.

According to an embodiment, an apparatus for video processing is provided. The apparatus may include at least one memory configured to store program code; and at least one processor configured to read the program code and operate as instructed by the program code. The program code may include first receiving code configured to cause the at least one processor to receive a bitstream comprising coded video data and a supplemental enhancement information (SEI) message; first obtaining code configured to cause the at least one processor to obtain a text prompt in the SEI message, wherein the text prompt instructs an artificial intelligence (AI) generative process to modify one or more images in the bitstream; and first generating code configured to cause the at least one processor to, responsive to obtaining the text prompt, generate one or more modified images using the AI generative process and the text prompt; and second generating code configured to cause the at least one processor to generate an output video sequence using reconstructed video data and the one or more modified images.

According to an embodiment, a non-transitory computer-readable medium storing instructions is provided. The instructions may include: one or more instructions that, when executed by one or more processors of a device, cause the one or more processors to perform a conversion between a visual media file and a bitstream of the visual media file, wherein the bitstream comprises at least one of: a supplemental enhancement information (SEI) message comprising a text prompt for instructing an artificial intelligence (AI)

generative process to generate one or more images; and a text prompt flag that indicates whether coded images in the bitstream comprise the one or more images generated using the AI generative process.

BRIEF DESCRIPTION OF THE DRAWINGS

Further features, nature, and various advantages of the disclosed subject matter will be more apparent from the following detailed description and the accompanying drawings in which:

FIG. 12 is an embodiment of a syntax for AI data SEI message, in accordance with embodiments of the present disclosure.

DETAILED DESCRIPTION

The following detailed description of example embodiments refers to the accompanying drawings. The same reference numbers in different drawings may identify the same or similar elements.

Figure 1:
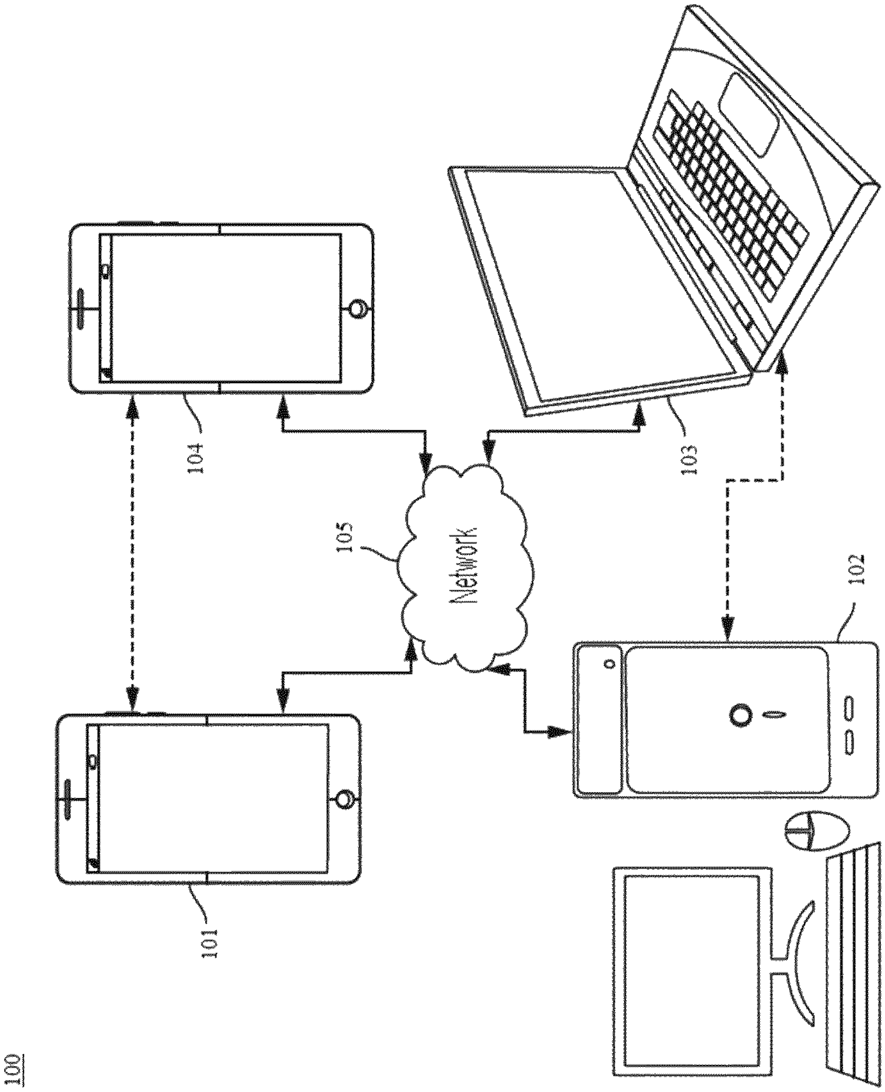
FIG. 1 is a schematic illustration of a simplified block diagram of a communication system, in accordance with embodiments of the present disclosure.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
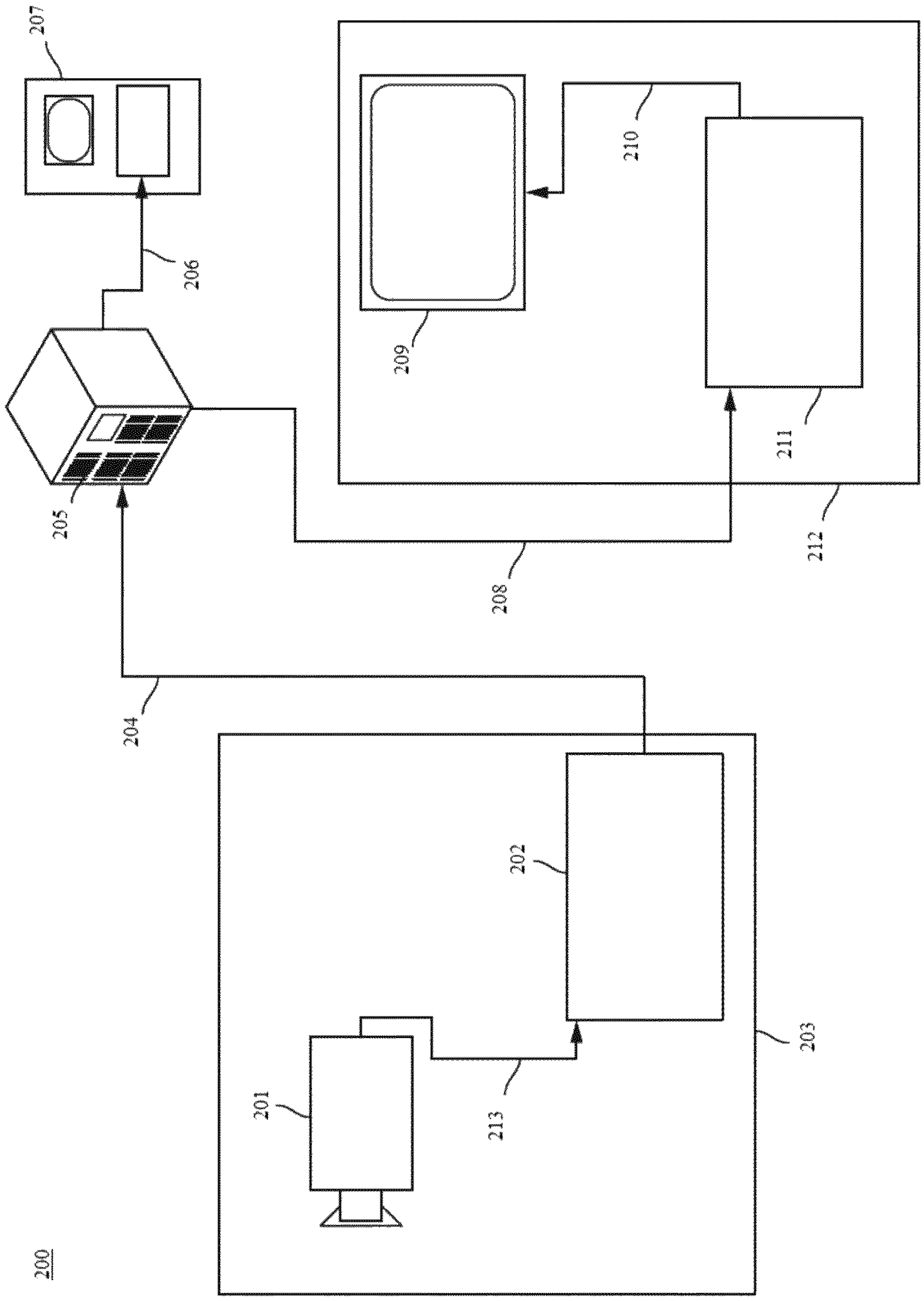
FIG. 2 is a schematic illustration of a simplified block diagram of a streaming system, in accordance with embodiments of the present disclosure.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device. In some streaming systems, the video bitstreams 204, 206 and 208 can be encoded according to certain video coding/compression standards. Examples of those standards are noted above and described further herein.

Figure 3:
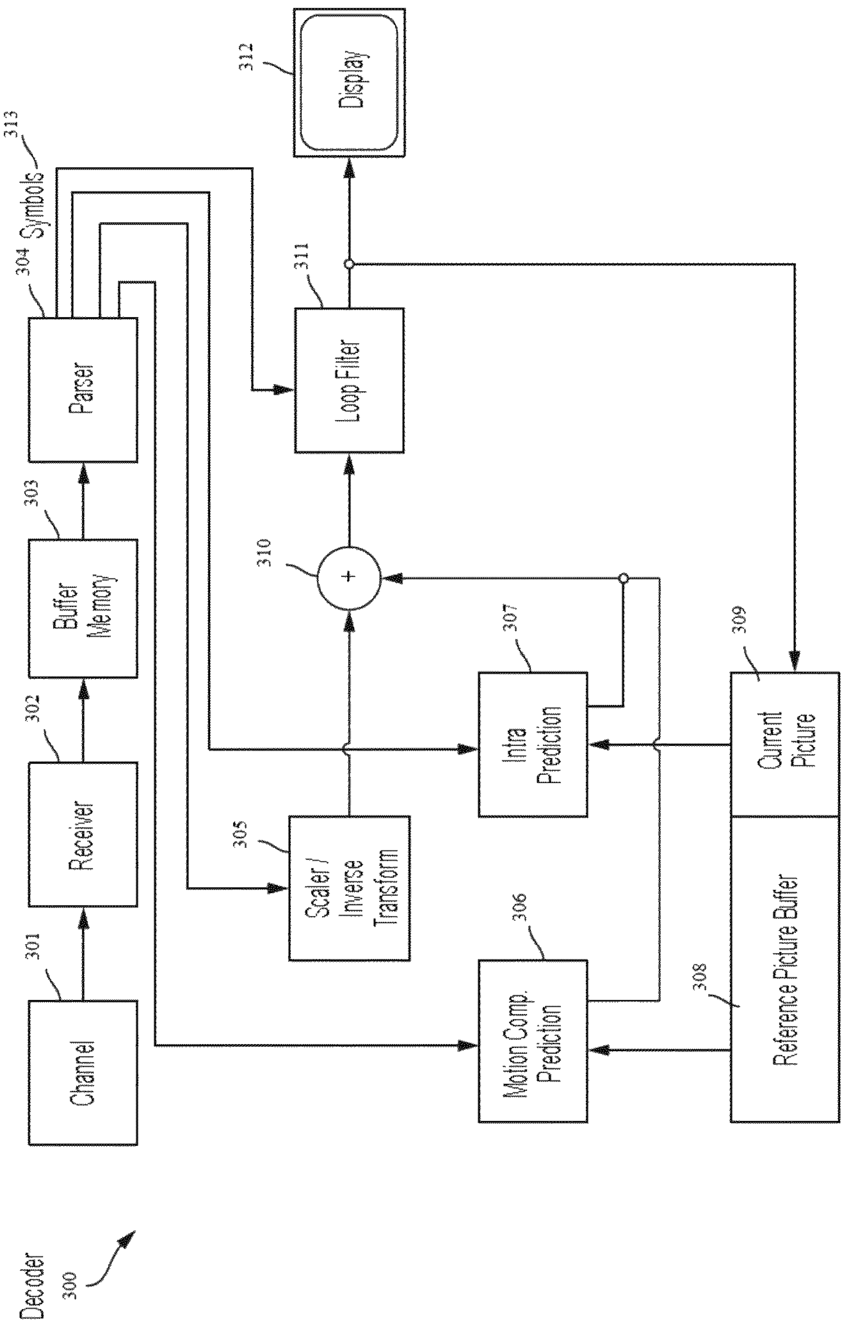
FIG. 3 is a schematic illustration of a simplified block diagram of a video decoder, in accordance with embodiments of the present disclosure.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities. The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments. The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
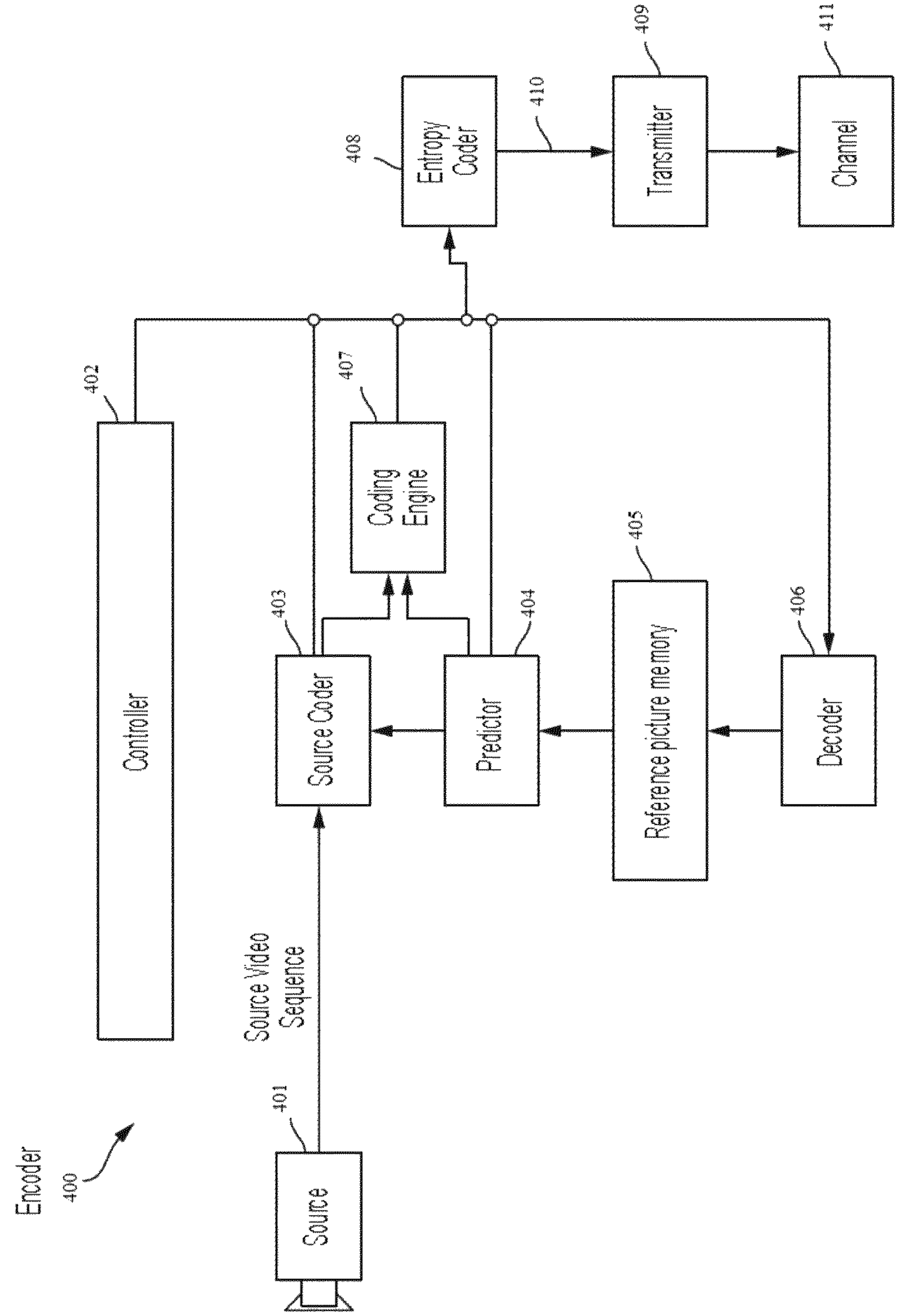
FIG. 4 is a schematic illustration of a simplified block diagram of a video encoder, in accordance with embodiments of the present disclosure.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder 303 in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder, the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams.

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Compressed video can be augmented, in the video bitstream, by supplementary enhancement information, for example in the form of Supplementary Enhancement Information (SEI) Messages or Video Usability Information (VUI). Video coding standards can include specifications parts for SEI and VUI. SEI and VUI information may also be specified in stand-alone specifications that may be referenced by the video coding specifications.

Figure 5:
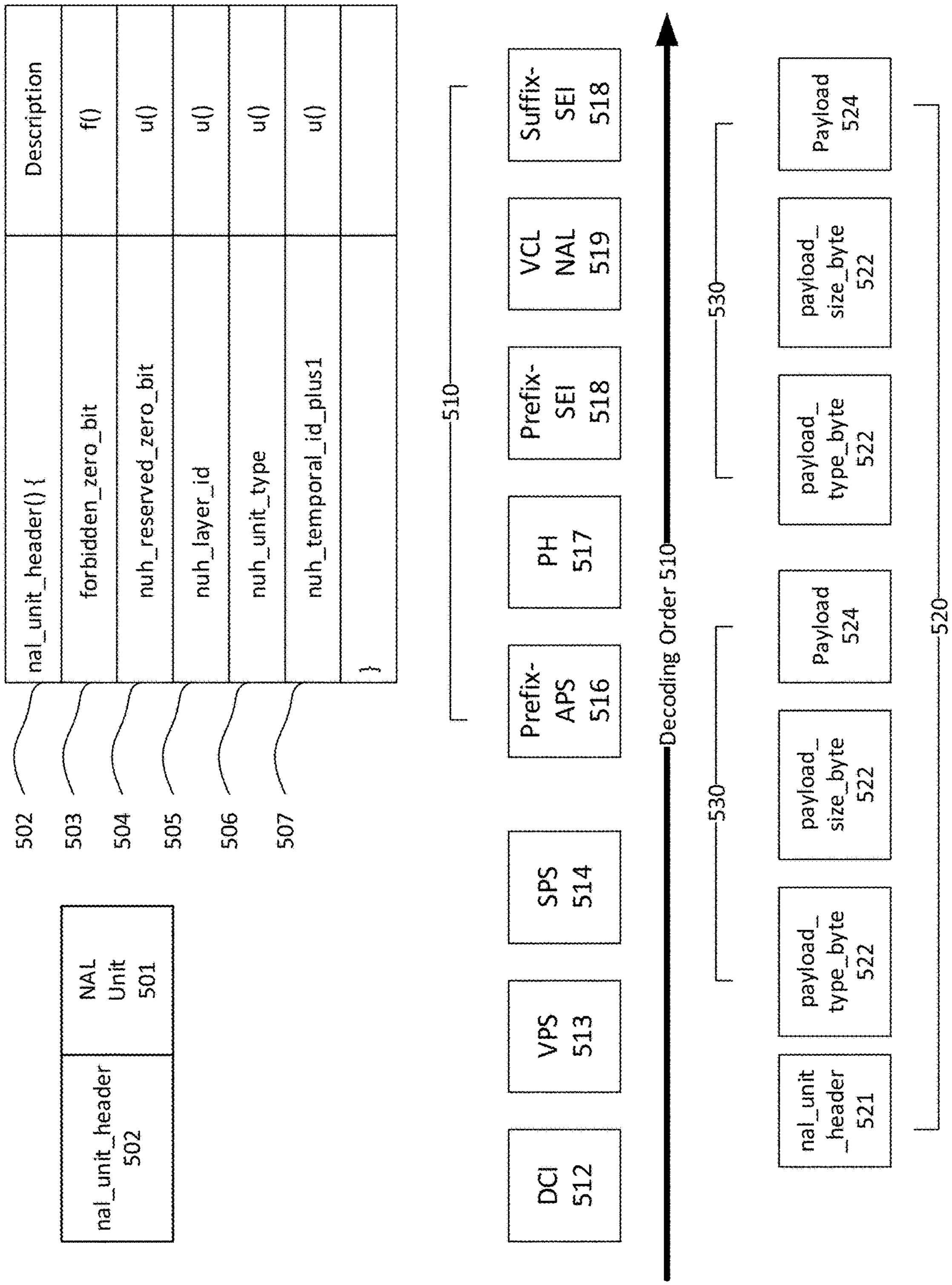
FIG. 5 is a schematic illustration of a NAL unit and SEI headers, in accordance with embodiments of the present disclosure.

FIG. 5 illustrates an exemplary layout of a Coded Video Sequence (CVS) in accordance with H.266. The coded video sequence is subdivided into Network Abstraction Layer units (NAL units). An exemplary NAL unit 501 can include a NAL unit header 502, which in turn comprises 16 bits as follows: a forbidden_zero_bit 503 and nuh_reserved_zero_bit 504 may be unused by H.266 and may be zero in a NAL unit. compliant with H.266. Three bits of nuh_layer_id 505 may be indicative of the (spatial, SNR, or multi-view enhancement) layer to which the NAL unit belongs. Five bits of nuh_nal_unit_type define the type of NAL unit. In H.266, 22 NAL unit type values are defined for NAL unit types defined in H.266, six NAL unit types are reserved, and four NAL unit type values are unspecified and can be used by specifications other than H.266. Finally, three bits of the NAL unit header indicate the temporal layer to which the NAL unit belongs nuh_temporal_id_plusl 506.

A coded picture may contain one or more Video Coding Layer (VCL) NAL units and zero or more non-VCL NAL units. VCL NAL units may contain coded data conceptually belonging to a video coding layer as introduced before. Non-VCL NAL units may contain data conceptually belonging data not conceptually belonging to the video coding layer, and can be characterized into:

(1) Parameter sets, which comprise information that can be necessary for the decoding process and can apply to more than one coded picture. Parameter sets and conceptually similar NAL units may be of NAL unit types such as DCI_NUT (Decoding Capability Information (DCI)), VPS_NUT (Video Parameter Set (VPS), establishing, among other things, layer relationships), SPS_NUT (Sequence Parameter Set (SPS), establishing, among other things, parameters used and staying constant throughout a coded video sequence CVS), PPS_NUT (Picture Parameter Set (PPS), establishing, among other things, parameter used and staying constant within a coded picture), and PREFIX_APS_NUT and SUFFIX_APS_NUT (prefix and suffix Adaptation Parameter Sets). Parameter sets may include information required for a decoder to decode VCL NAL units, and hence are referred here as "normative" NAL units.

(2) Picture Header (PH_NUT), which is also a "normative" NAL unit.

(3) NAL units marking certain places in a NAL unit stream. Those include NAL units with the NAL unit types AUD_NUT (Access Unit Delimiter), EOS_NUT (End of Sequence) and EOB_NUT (End of Bitstream). These are non-normative, also known as informative, in the sense that a compliant decoder does not require them for its decoding process, although it needs to be able to receive them in the NAL unit stream.

(4) Prefix and Suffix SEI Nal unit types (PREFIX_SEI_NUT and SUFFIX_SEI_NUT) which indicate NAL units containing Prefix and Suffix supplementary enhancement information. IN H.266, those NAL units are informative, as they are not required for the decoding process.

(5) Filler Data NAL unit type FD_NUT indicates filler data; data that can be random and can be used to "waste" bits in a NAL unit stream or bitstream, which may be necessary for the transport over certain isochronous transport environments.

(6) Reserved and Unspecified NAL unit types.

Referring to FIG. 5, a layout of a NAL unit stream in decoding order 510 containing a coded picture 511 containing NAL units of some of the types previously introduced. Somewhere early in the NAL unit stream, DCI 512, VPS 513, and SPS 514 may, in combination, establish the parameters which the decoder can use to decode the coded pictures of a coded video sequence (CVS), including coded picture 511 of the NAL unit stream.

The coded picture 511 can contain, in the depicted order or any other order compliant with the video coding technology or standard in use: a Prefix APS 516, Picture header 517, prefix SEI 518, one or more VCL NAL units 519, and suffix SEI 520.

Prefix and suffix SEI NAL units (e.g., 518 and 520) were motivated during the standards development as, for some SEI messages, the content of the message would be known before the coding of a given picture commences, whereas other content would only be known once the picture were coded. Allowing certain SEI messages to appear early or late in a coded picture's NAL unit stream through prefix and suffix SEIs allows avoiding buffering. As one example, in an encoder the sampling time of a picture to be coded is known before the picture is coded, and hence the picture timing SEI message can be a prefix SEI message 516.

On the other hand, a decoded picture hash SEI message, which contains a hash of the sample values of a decoded pictures and can be useful, for example, to debug encoder implementations, is a suffix SEI message 518 as an encoder cannot calculate a hash over reconstructed samples before a picture has been coded. The location of Prefix and Suffix SEI NAL units may not be restricted to their position in the NAL unit stream. The phrase "Prefix" and "Suffix" may imply to what coded pictures or NAL units the Prefix/Suffix SEI message may pertain to, and the details of this applicability may be specified, for example in the semantics description of a given SEI message.

Referring again to FIG. 5, a simplified syntax diagram of a NAL unit that contains a prefix or suffix SEI message 520. This syntax is a container format for multiple SEI messages that can be carried in one NAL unit. Details of the emulation prevention syntax specified in H.266 are omitted here for clarity. As other NAL units, SEI NAL units start with a NAL unit header 521. The header is followed by one or more SEI messages; two are depicted (e.g., 530, 531 and described henceforth. Each SEI message inside the SEI NAL unit includes an 8 bit payload_type_byte 522 which specifies one of 256 different SEI types; an 8 bit payload_size_byte 523 which specifies the number of bytes of the SEI payload, and payload_size-byte number of bytes Payload 524. This structure can be repeated until a payload_type_byte equal to 0xff is observed, which indicates the end of the NAL unit. The syntax of the Payload 524 depends on the SEI message, it can be of any length between 0 and 255 bytes.

Figure 6:
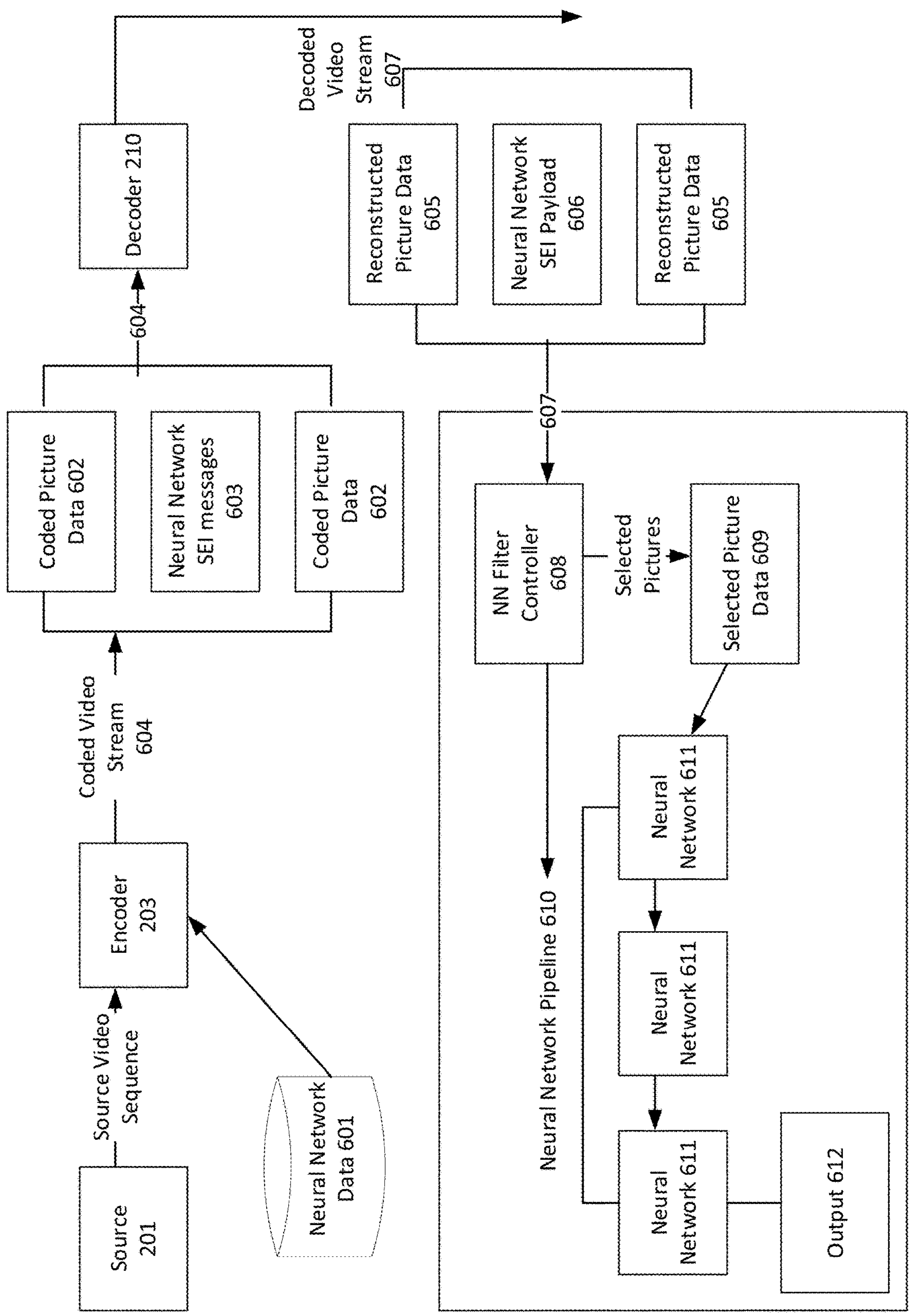
FIG. 6 is a schematic illustration of a simplified encoding and decoding system that employs a neural network post filtering process in which neural network models are carried or referenced from SEI messages, in accordance with embodiments of the present disclosure.

FIG. 6 may be a functional block diagram of an encoding and decoding system that employs a neural network post filtering process 613 in which the neural network models are either carried in the payload of the SEI message or referenced in the SEI message by a URI to a source external to the coded video stream. Such an example system can include a video source 201, for example a digital camera, creating a for example source video sequence that is input to an encoder 203. In addition to the source video sequence, the encoder 203 can receive input from a for example separate source 601 that contains one or more neural network models that can be used in a post filtering process 613. The output from the encoder 203 is a coded video stream 604 comprised of one or more sequences of coded picture data 602 and SEI messages 603 that may reference or carry neural network model information in the payload of the SEI messages 603. Coded video stream 604 is input into a decoder 210 that can output the decoded video stream 607 comprised of sequences of reconstructed picture data 605 and payloads 606 of the neural network SEI messages. Decoded video stream 604 can be input to a neural network post filtering process 613 in which a neural network filter controller 608 performs any series of steps that can include: 1) selecting picture data 609 from amongst the data in the decoded video stream 607 and establishing a sequence of one or more neural network filters 611 that comprise a "pipeline" 610 of neural network filters according to the SEI payloads 606. Output 612 from the neural network pipeline 610 may also be the output from the neural network post filtering process 613.

Figure 7:
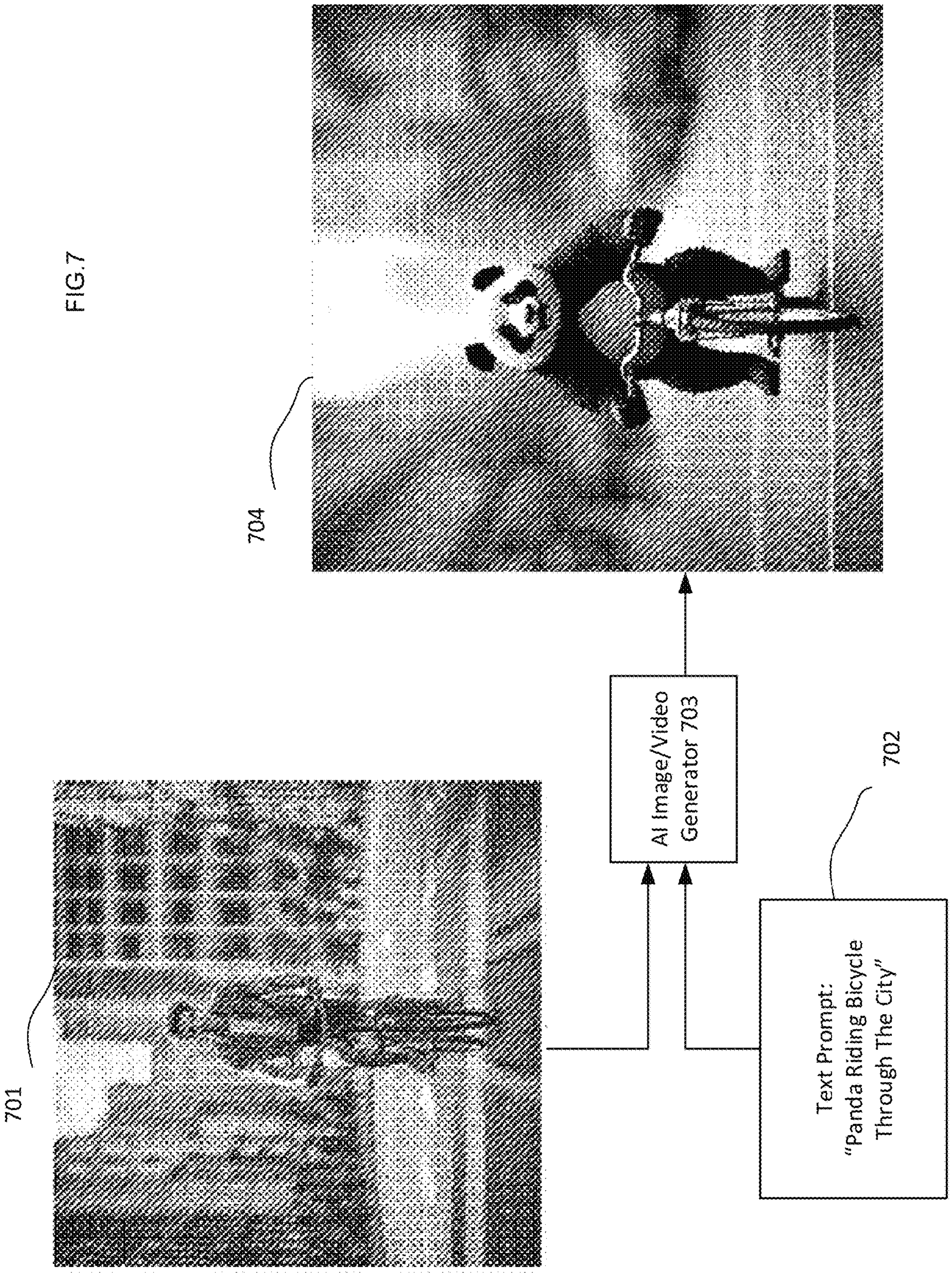
FIG. 7 is a schematic illustration of an AI image or video generator application, in accordance with embodiments of the present disclosure.

FIG. 7 is a schematic illustration of an AI image or video generator application. AI image or video generator 703 receives video sequence 701 and text prompt 702 to guide the AI image or video generator 703 process. Output image or video sequence 704 is output from AI image or video generator 703.

Figure 8:
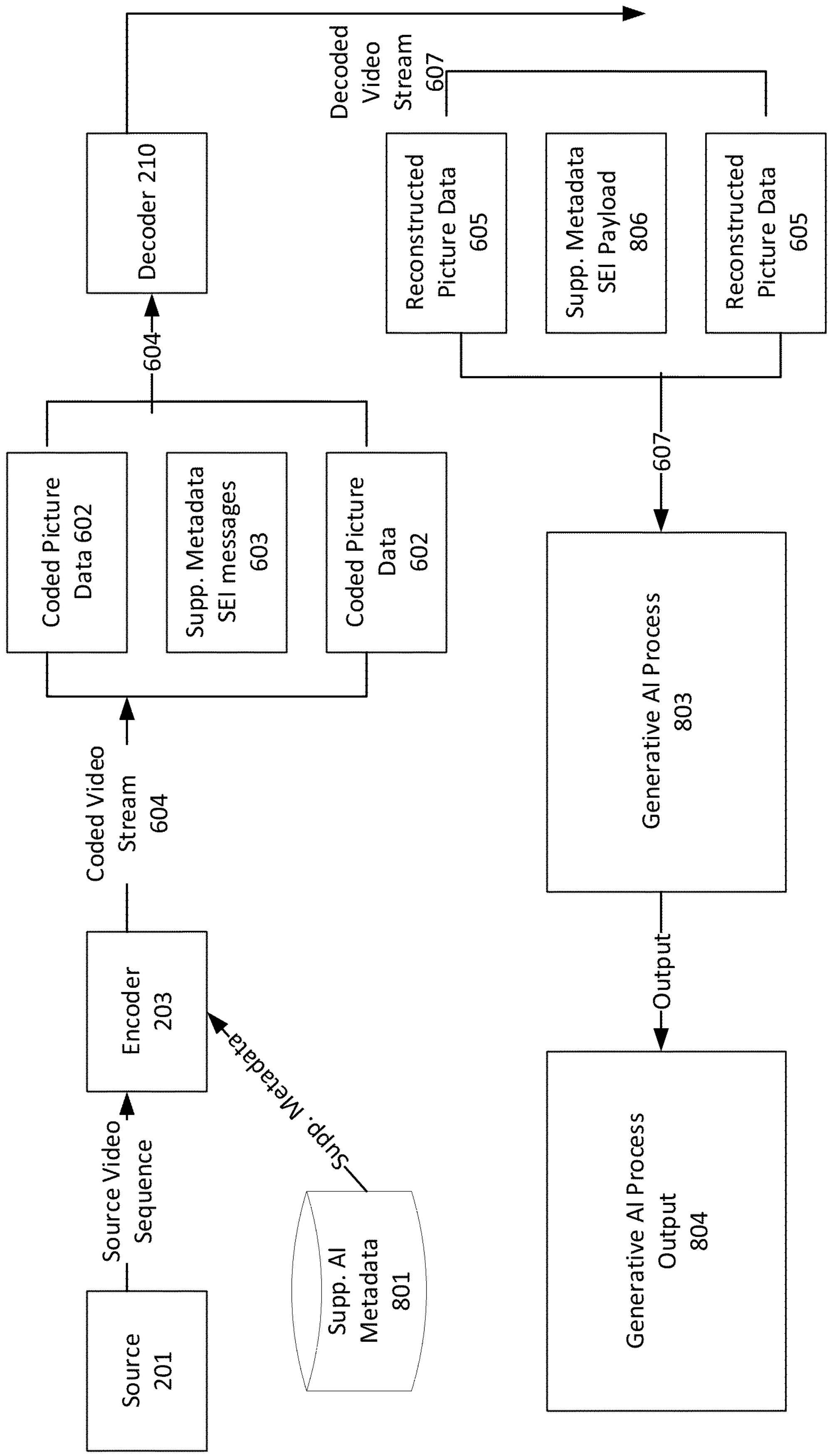
FIG. 8 is a schematic illustration of a scenario in which an AI image or video generator application leverages a video encoding and decoding process to create input to the AI image or video generator application, in accordance with embodiments of the present disclosure.

FIG. 8 is a functional block diagram of an encoding and decoding system that employs a generative AI post filtering process 803. Such an example system can include a video source 201, for example a digital camera, creating a for example source video sequence that is input to an encoder 203. Depicted in the figure is a separate source 801 of supplemental data 805 that may further describe video source 201. Encoder 203 can receive both the supplemental metadata and the source video sequence.

The output from the encoder 203 is a coded video stream 604 comprised of one or more sequences of coded picture data 602 and SEI messages 802 that may reference or carry the supplemental metadata in the payload of the SEI messages 802. Coded video stream 604 is input into a decoder 210 that can output the decoded video stream 607 comprised of sequences of reconstructed picture data 605 and payloads 806 of supplemental data SEI messages. Decoded video stream 607 can be input to a generative AI post filtering process 803. Output 804 can be from the generative AI post filtering process 803.

Embodiments of the present disclosure relate to an AI text string prompt used for generating the contents of an image area. According to embodiments, the prompt flag equal to 1 may indicate that the AI text string prompt is present, and the prompt flag being equal to 0 indicates that the AI text string prompt is not present. When a prompt flag is equal to 1, AI text string prompt may not be a null string.

Figure 9:
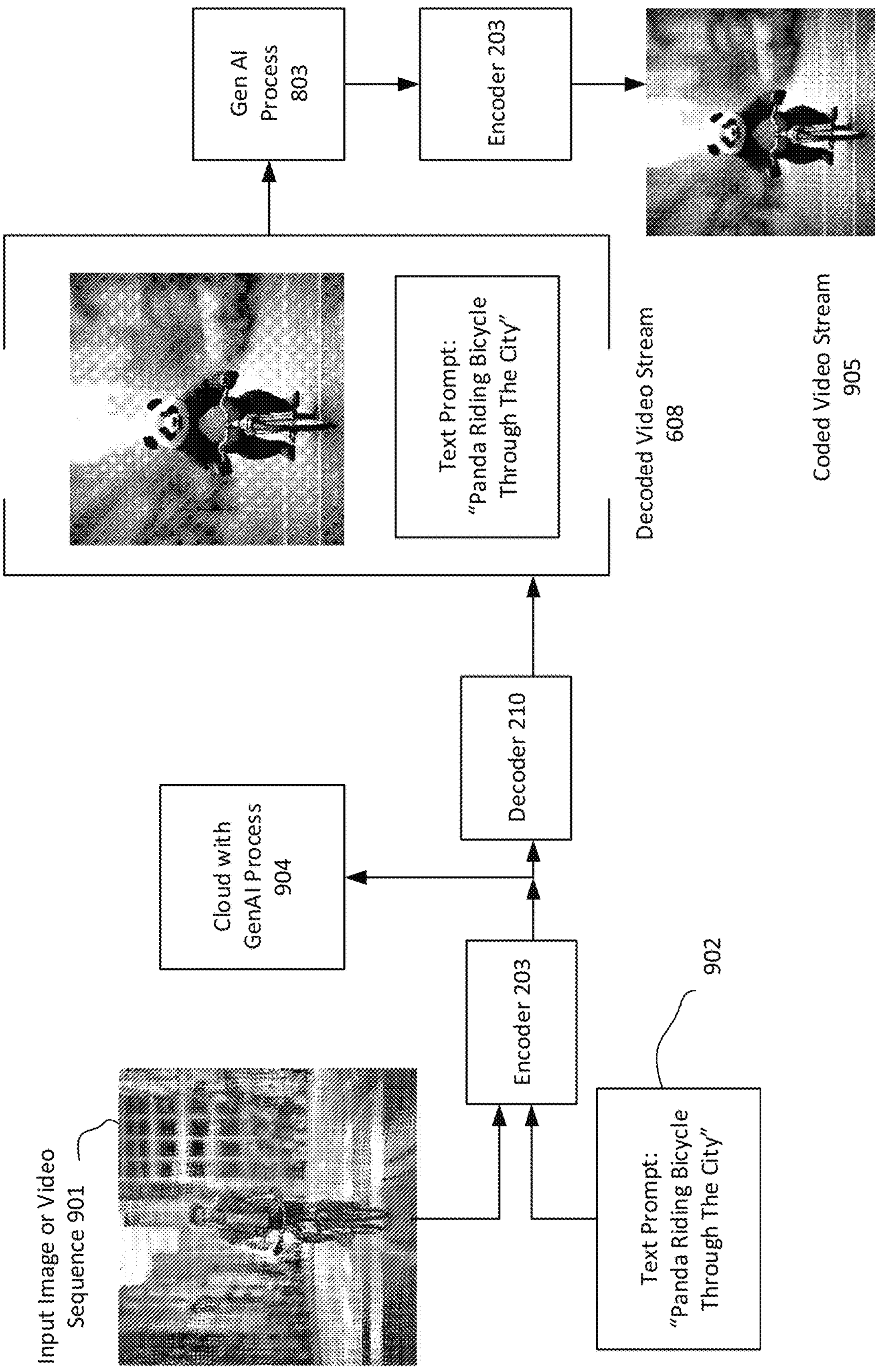
FIG. 9 is a schematic illustration of a scenario in which an AI image or video generator application leverages a video encoding and decoding process to create input to guide the AI image or video generator application, in accordance with embodiments of the present disclosure.

FIG. 9 is a functional block diagram to illustrate a scenario of an AI text data SEI message. Input image or video sequence 901 is provided to an encoder 203. At approximately the same time, a user 903 provides a text prompt 902 to guide an AI image generative process 803 to generate an image of a panda riding a bicycle in the city. Network over a cloud 904 transmits the coded video stream with AI text data SEI message(s) to decoder 210 from which decoded video stream 608 is created. Decoded video stream 608 is input to AI generative process 803. Process 803 creates output that is input to a second encoder 203. Second encoder 203 emits coded video stream 905 comprised of a video or image sequence of a panda riding a bicycle in a city, i.e., as guided by text prompt 902.

Figure 10:
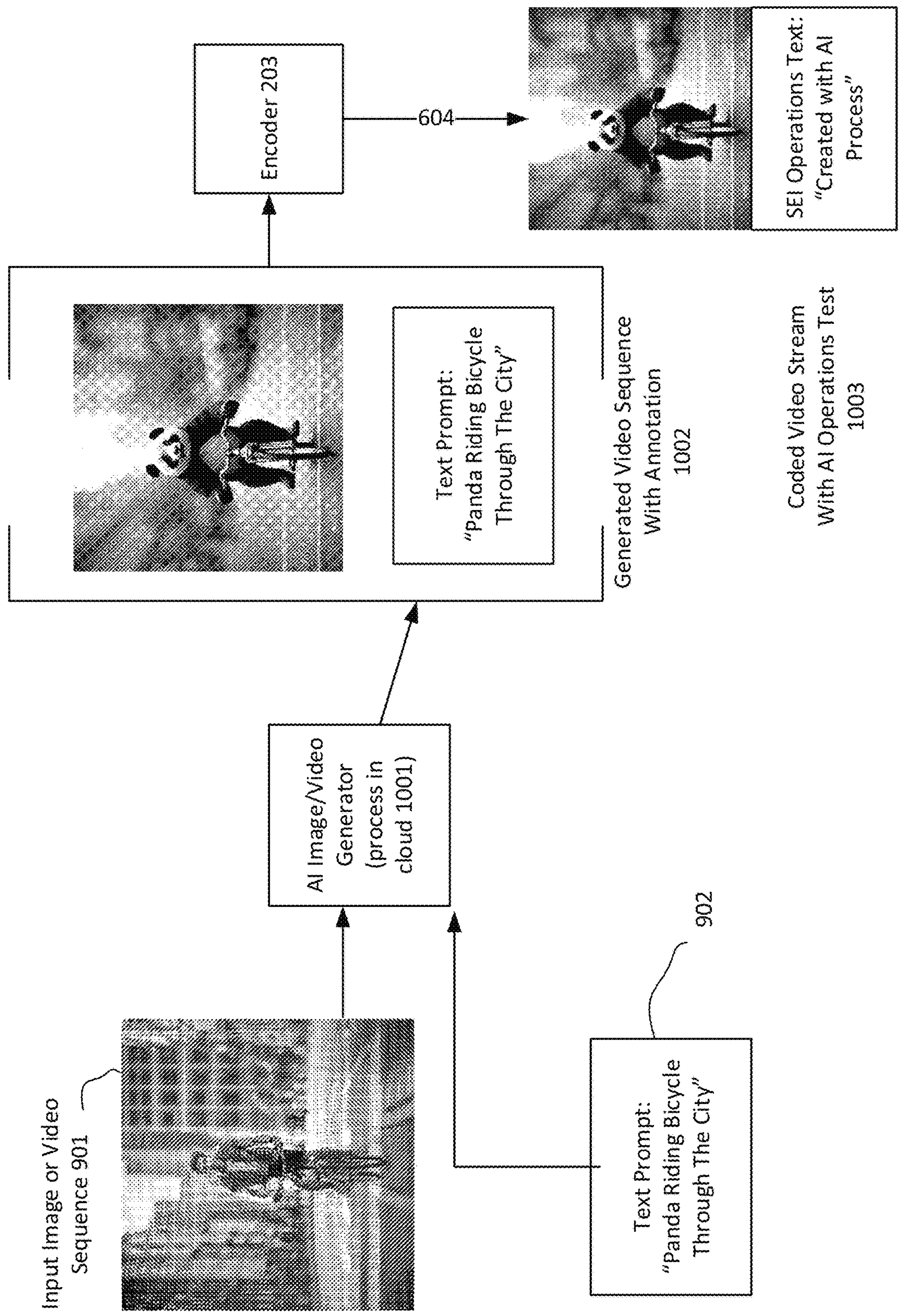
FIG. 10 is a schematic illustration of an output from an generative AI application in which a text stream to record the use of an AI process in the creation of the generated imagery is provided and encoded into the video stream, in accordance with embodiments of the present disclosure.

FIG. 10 is a functional block diagram to illustrate an AI text data SEI message. In this figure, user 903 provides a text prompt 902 to an image or video generator process 1001 located in a cloud. Image or video generator also receives a video sequence 901. Note that the method by which process 1001 receives sequence 901 is not depicted in the figure. Process 1001 creates output video sequence 1002 that contains a annotation message to indicate that the sequence was "created with an AI generation process." Sequence 1002 is input to an encoder 203. Encoder 203 creates a coded video stream 604 with AI text data SEI message to indicate the provenance of the sequence 1002, i.e., that sequence 1002 was created with an AI generation process.

Figure 11:
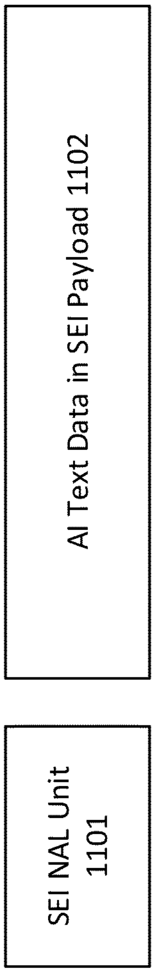
FIG. 11 is an illustration of AI text data packaged into an SEI message, in accordance with embodiments of the present disclosure.

FIG. 11 is an illustration of AI text data 1102 packaged into an SEI message that can be specified by a video standard for the purpose of carrying the AI test data in a coded video stream created by an encoder. As per the specifications of video standards, the presence of SEI message 1102 is signaled by an SEI NAL unit 1101).

FIG. 11 illustrates an embodiment of a syntax for a text prompt SEI message. Cancel flag 1201 can be used to disable the persistence of a previously processed AI text SEI message. If flag 1201 is set to a value indicating 'false' then XMP mode ID 1202 can indicate whether the payload of the SEI message is the XMP metadata itself or a URI for the location of the XMP metadata. If mode ID 1202 is equal to ZERO, then XMP data payload byte 1203 receives a byte of data from the SEI payload. If mode ID 1202 is equal to ONE, then XMP data URI 1204 receives a string of data from the SEI payload.

FIG. 12 is an embodiment of a syntax for an AI data SEI message. In embodiments, ai_data_purpose 1201 (it should be noted that the name of the parameters are used are an example herein) ("ai" may also be referred to "ait") can be used to distinguish between the purposes of the text string in the SEI payload. If the value of the ai_data_purpose is equal to a value of ZERO, then the purpose of the AI data is to capture the text prompt that a user has provided as input to an AI image or video generation application. If the value of ai_data_purpose 1201 is equal to a value of ONE, then the purpose of the AI data is to capture the fact that an AI image or video generation process was used to create the output of the AI image or video generation process. If the ai_data_cancel flag 1202 is set to a value of ZERO, then the remainder of the SEI payload for the AI data SEI message is processed. If the ai_data_cancel_flag is set to a nonzero value, then there is no remaining SEI payload that should be processed for the current AI data SEI message. When ai_data_cancel_flag 1202 is set to a value of ZERO, then a single byte ai_data_persistence_flag 1203 is stored. If flag 1203 is equal to ZERO, then the AI data SEI message applies to the current picture only. If flag 1203 is equal to a value of ONE then the AI data SEI message applies to the current decoded picture and persists for all subsequent pictures of the current layer in output order until one or more of the following conditions are true: 1) A new CLVS of the current layer begins; 2) The bitstream ends or 3) A picture in the current layer in an AU associated with a film grain characteristics SEI message is output that follows the current picture in output order. ai_data_string 1204 receives a string from the payload of the AI data SEI message payload.

The techniques described above, can be implemented as computer software using computer-readable instructions and physically stored in one or more computer-readable media or by a specifically configured one or more hardware processors. For example, FIG. 13 shows a computer system 1300 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
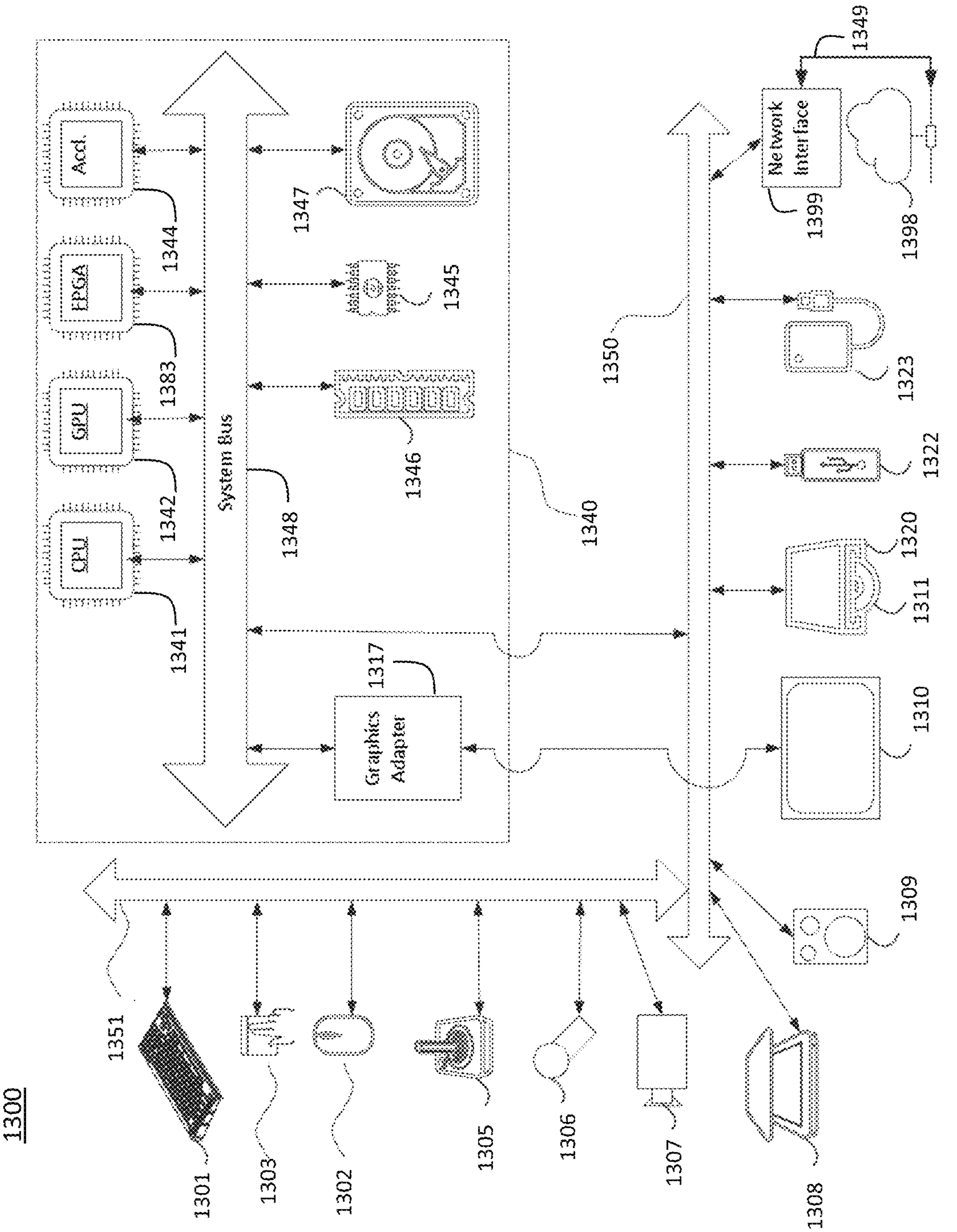
FIG. 13 is an exemplary diagram of a computer system suitable for implementing embodiments.

The components shown in FIG. 13 for computer system 1300 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1300.

Computer system 1300 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1301, mouse 1302, trackpad 1303, touch screen 1310, joystick 1305, microphone 1306, scanner 1308, camera 1307.

Computer system 1300 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1310, or joystick 1305, but there can also be tactile feedback devices that do not serve as input devices), audio output devices (such as: speakers 1309, headphones), visual output devices (such as screens 1310 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses, holographic displays and smoke tanks), and printers.

Computer system 1300 can also include human accessible storage devices and their associated media such as optical media including CD/DVD ROM/RW 1320 with CD/DVD 1311 or the like media, thumb-drive 1322, removable hard drive or solid state drive 1323, legacy magnetic media such as tape and floppy disc, specialized ROM/ASIC/PLD based devices such as security dongles, and the like.

Those skilled in the art should also understand that term "computer readable media" as used in connection with the presently disclosed subject matter does not encompass transmission media, carrier waves, or other transitory signals.

Computer system 1300 can also include interface 1399 to one or more communication networks 1398. Networks 1398 can for example be wireless, wireline, optical. Networks 1398 can further be local, wide-area, metropolitan, vehicular and industrial, real-time, delay-tolerant, and so on. Examples of networks 1398 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1398 commonly require external network interface adapters that attached to certain general-purpose data ports or peripheral buses (1350 and 1351) (such as, for example USB ports of the computer system 1300; others are commonly integrated into the core of the computer system 1300 by attachment to a system bus as described below (for example Ethernet interface into a PC computer system or cellular network interface into a smartphone computer system). Using any of these networks 1398, computer system 1300 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1340 of the computer system 1300.

The core 1340 can include one or more Central Processing Units (CPU) 1341, Graphics Processing Units (GPU) 1342, a graphics adapter 1317, specialized programmable processing units in the form of Field Programmable Gate Areas (FPGA) 1343, hardware accelerators for certain tasks 1344, and so forth. These devices, along with Read-only memory (ROM) 1345, Random-access memory 1346, internal mass storage such as internal non-user accessible hard drives, SSDs, and the like 1347, may be connected through a system bus 1348. In some computer systems, the system bus 1348 can be accessible in the form of one or more physical plugs to enable extensions by additional CPUs, GPU, and the like. The peripheral devices can be attached either directly to the core's system bus 1348, or through a peripheral bus 1349. Architectures for a peripheral bus include PCI, USB, and the like.

CPUs 1341, GPUs 1342, FPGAs 1343, and accelerators 1344 can execute certain instructions that, in combination, can make up the aforementioned computer code. That computer code can be stored in ROM 1345 or RAM 1346. Transitional data can be also be stored in RAM 1346, whereas permanent data can be stored for example, in the internal mass storage 1347. Fast storage and retrieval to any of the memory devices can be enabled through the use of cache memory, that can be closely associated with one or more CPU 1341, GPU 1342, mass storage 1347, ROM 1345, RAM 1346, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1300, and specifically the core 1340 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1340 that are of non-transitory nature, such as core-internal mass storage 1347 or ROM 1345. The software implementing various embodiments of the present disclosure can be stored in such devices and executed by core 1340. A computer-readable medium can include one or more memory devices or chips, according to particular needs. The software can cause the core 1340 and specifically the processors therein (including CPU, GPU, FPGA, and the like) to execute particular processes or particular parts of particular processes described herein, including defining data structures stored in RAM 1346 and modifying such data structures according to the processes defined by the software. In addition or as an alternative, the computer system can provide functionality as a result of logic hardwired or otherwise embodied in a circuit (for example: accelerator 1344), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method of video encoding and/or decoding, the method including receiving a text prompt from a user device, the text prompt being used for instructing an artificial intelligence (AI) generative process to generate one or more images; encoding a video in a bitstream, the video comprising the one or more images generated using the AI generative process and the text prompt; signaling the text prompt in the bitstream in a supplemental enhancement information (SEI) message; and signaling the encoded video comprising the one or more images.

(2) The method of feature (1), in which the text prompt is comprised in a SEI payload of an SEI NAL unit.

(3) The method of any of the features of (1) to (2), in which the method further comprises signaling a text prompt flag in the bitstream, wherein a first value of the text prompt flag indicates that the encoded video comprises the one or more images generated using the AI generative process.

(4) The method of any of the features of (1) to (3), in which the text prompt is in a string format.

(5) The method of any of the features of (1) to (4), in which the one or more images generated using the AI generative process and the text prompt are generated by the user device.

(6) The method of any of the features of (1) to (5), in which the one or more images generated using the AI generative process and the text prompt are generated in a cloud computing environment.

(7) The method of any of the features of (1) to (6), in which when the one or more images are generated in the cloud computing environment, the bitstream further comprises an indication syntax element that indicates that the video encoded in the bitstream is created using an AI generative process.

(8) The method of any of the features of (1) to (7), in which the method further comprises receiving a bitstream comprising coded video data and a supplemental enhancement information (SEI) message; obtaining a text prompt in the SEI message in which the text prompt instructs an artificial intelligence (AI) generative process to modify one or more images in the bitstream; generating responsive to obtaining the text prompt, one or more modified images using the AI generative process and the text prompt; and generating an output video sequence using reconstructed video data and the one or more modified images.

(9) The method of any of the features of (1) to (8), in which the generating the one or more modified images using the AI generative process and the text prompt comprises inputting the reconstructed video data and the text prompt in a machine learned AI model.

(10) The method of any of the features of (1) to (9), in which the method further includes performing a conversion between a visual media file and a bitstream of the visual media file, in which the bitstream comprises at least one of a supplemental enhancement information (SEI) message comprising a text prompt for instructing an artificial intelligence (AI) generative process to generate one or more images; and a text prompt flag that indicates whether coded images in the bitstream comprise the one or more images generated using the AI generative process.

(11) The method of any of the features of (1) to (10), in which the bitstream comprises the text prompt during an encoding process of the visual media file to the bitstream.

(12) The method of any of the features of (1) to (11), in which the bitstream comprises the text prompt flag during a decoding process of the visual media file from the bitstream.

(13) The method of any of the features of (1) to (12), in which when the bitstream comprises the text prompt flag, the text prompt is not a null string.

(14) The method of any of the features of (1) to (13), in which the text prompt instructs the AI generative process to generate the one or more images at one of a user device subsequent to decoding the visual media file and a cloud computing environment prior to encoding the visual media file.

(15) An apparatus for video decoding, including processing circuitry that is configured to perform the method of any of features (1) to (14).

(16) An apparatus for video encoding, including processing circuitry that is configured to perform the method of any of features (1) to (14).

(17) A non-transitory computer-readable storage medium storing instructions which when executed by at least one processor cause the at least one processor to perform the method of any of features (1) to (14).

What is claimed is:

1. A method for video decoding, the method comprising:

receiving a video bitstream comprising a current block in a current picture; and decoding the current block based on a supplemental enhancement information (SEI) message included in the video bitstream and representing a text prompt from a user device, the text prompt being used for instructing an artificial intelligence (AI) generative process to generate one or more images, and the SEI message indicating, in a payload of the SEI message, neural-network post-filter characteristics specifying a neural network, among a plurality of neural networks, as a post-processing filter.

2. The method of claim 1, wherein the text prompt is comprised in the SEI payload which is of an SEI NAL unit.

3. The method of claim 1, wherein the bitstream indicates a text prompt flag, and a first value of the text prompt flag indicates generation of one or more images using the AI generative process.

4. The method of claim 1, wherein the text prompt is in a string format.

5. The method of claim 1, wherein the one or more images generated using the AI generative process and the text prompt are generated by the user device.

6. The method of claim 1, wherein the one or more images generated using the AI generative process and the text prompt are generated in a cloud computing environment.

7. The method of claim 6, wherein based on the one or more images being generated in the cloud computing environment, the bitstream further comprises an indication of the AI generative process.

8. A method of video encoding, the method comprising:

receiving a video data comprising a current block in a current picture; and encoding the current block to a video bitstream and based on a supplemental enhancement information (SEI) message to be included in the video bitstream and representing a text prompt from a user device, the text prompt being used for instructing an artificial intelligence (AI) generative process to generate one or more images, and the SEI message indicating, in a payload of the SEI message, neural-network post-filter characteristics specifying a neural network, among a plurality of neural networks, as a post-processing filter.

9. The method of claim 8, wherein the text prompt is comprised in the SEI payload which is of an SEI NAL unit.

10. The method of claim 8, wherein the bitstream indicates a text prompt flag, and a first value of the text prompt flag indicates generation of one or more images using the AI generative process.

11. The method of claim 8, wherein the text prompt is in a string format.

12. The method of claim 8, wherein the one or more images generated using the AI generative process and the text prompt are generated by the user device.

13. The method of claim 8, wherein the one or more images generated using the AI generative process and the text prompt are generated in a cloud computing environment.

14. A non-transitory computer-readable storage medium storing instructions and a video bitstream that are generated by a video encoding method, the instructions, when executed by a computer, cause the computer to implement a video encoding method comprising:

receiving a video data comprising a current block in a current picture;

encoding the current block to a video bitstream and based on a supplemental enhancement information (SEI) message to be included in the video bitstream and representing a text prompt from a user device, the text prompt being used for instructing an artificial intelligence (AI) generative process to generate one or more images, and the SEI message indicating, in a payload of the SEI message, neural-network post-filter characteristics specifying a neural network, among a plurality of neural networks, as a post-processing filter; and transmitting the video bitstream.

15. The non-transitory computer readable medium of claim 14, wherein the text prompt is comprised in the SEI payload which is of an SEI NAL unit.

16. The non-transitory computer readable medium of claim 14, wherein the bitstream indicates a text prompt flag, and a first value of the text prompt flag indicates generation of one or more images using the AI generative process.

17. The non-transitory computer readable medium of claim 14, wherein the text prompt is in a string format.

18. The non-transitory computer readable medium of claim 14, wherein the one or more images generated using the AI generative process and the text prompt are generated by the user device.

19. The non-transitory computer readable medium of claim 14, wherein the one or more images generated using the AI generative process and the text prompt are generated in a cloud computing environment.

20. The non-transitory computer readable medium of claim 14, wherein based on the one or more images being generated in the cloud computing environment, the bitstream further comprises an indication of the AI generative process.

* * * * *